United States Patent [19]

Miki

[11] Patent Number: 6,088,672
[45] Date of Patent: Jul. 11, 2000

[54] VOICE RECOGNITION SYSTEM CAPABLE OF SORTING PROSPECTIVE RECOGNITION RESULTS OBTAINED FOR A VOICE IN OPTIMIZED ORDER BY A LANGUAGE PROCESSING

[75] Inventor: Kiyokazu Miki, Tokyo, Japan

[73] Assignee: NEC Corporation, Tokyo, Japan

[21] Appl. No.: 09/131,547

[22] Filed: Aug. 10, 1998

[30] Foreign Application Priority Data

Aug. 8, 1997 [JP] Japan ..................................... 9-227584

[51] Int. Cl.⁷ .............................. G10L 17/00; G10L 15/12
[52] U.S. Cl. ............................................. 704/246; 704/249
[58] Field of Search ..................................... 704/231, 232, 704/236, 240, 242, 246, 249, 250

[56] References Cited

U.S. PATENT DOCUMENTS

| | | | |
|---|---|---|---|
| 4,712,243 | 12/1987 | Ninomiya et al. | 704/250 |
| 5,091,947 | 2/1992 | Ariyoshi et al. | 704/246 |
| 5,381,513 | 1/1995 | Tsuboka | 704/232 |
| 5,655,058 | 8/1997 | Balasubramanian et al. | 704/255 |
| 5,692,097 | 11/1997 | Yamada et al. | 704/241 |
| 5,704,005 | 12/1997 | Iwamida | 704/254 |
| 5,774,850 | 6/1998 | Hattori et al. | 704/250 |

FOREIGN PATENT DOCUMENTS 8-328580  12/1996  Japan .

OTHER PUBLICATIONS

Gish et al., "Segregation of Speakers for Speech Recognition and Speaker Identification," 1991 International Conference on Acoustics, Speech, and Signal Processing, vol. 2, pp. 873 to 876, Apr. 1991.

Siu et al., "An Unsupervised, Sequential Learning Algorithm for the Segmentation of Speech Waveforms with Multiple Speakers," 1991 IEEE International Conference on Acoustics, Speech, and Signal Processing, vol. 2, pp. 189 to 192, Mar. 1992.

Primary Examiner—David R. Hudspeth
Assistant Examiner—Martin Lerner
Attorney, Agent, or Firm—Foley & Lardner

[57] ABSTRACT

In a voice recognition system which seeks a plurality of prospective recognition results with respect to at least two input voices and which select each one prospective recognition result among respective a plurality of prospective recognition results with respect to the two input voices, so that an optimized sequence of recognition results is obtained as a whole, primary and secondary language processing are simultaneously carried out by the use of dynamic programming on a primary prospective recognition result of an input voice preceding an appointed input voice and on a secondary prospective recognition result of another input voice following the appointed input voice, respectively, a cumulative score of an optimized path is calculated on each of appointed prospective recognition results with reference to results of the primary and the secondary language processing to sort the appointed prospective recognition results of the appointed voice in optimized order.

7 Claims, 8 Drawing Sheets

| CUMULATIVE SCORE | FIRST VOICE | SECOND VOICE | THIRD VOICE |
|---|---|---|---|
| 行なわ、100 | 見る、10 | 開かれて、10 | 見る、8 |
| 沖縄、90 | れる、8 | | いる、7 |
| 驚か、60 | で、7 | | 着る、6 |

FIG.5

| | |
|---|---|
| 行なわ → 見る | 0 |
| 行なわ → れる | 10 |
| 行なわ → で | 0 |
| 沖縄 → 見る | 2 |
| 沖縄 → れる | 0 |
| 沖縄 → で | 15 |
| 驚か → 見る | 0 |
| 驚か → れる | 8 |
| 驚か → で | 0 |
| 見る → 開かれて | 1 |
| れる → 開かれて | 1 |
| で → 開かれて | 20 |
| 開かれて → 見る | 5 |
| 開かれて → いる | 10 |
| 開かれて → 着る | 3 |

FIG.6

VOICE RECOGNITION SYSTEM CAPABLE OF SORTING PROSPECTIVE RECOGNITION RESULTS OBTAINED FOR A VOICE IN OPTIMIZED ORDER BY A LANGUAGE PROCESSING

BACKGROUND OF THE INVENTION

The present invention relates to a voice recognition system, particularly to a voice recognition system which selects an optimized sequence of recognition results as a whole from a plurality of prospective voice recognition results, respectively for more than two voices.

Conventionally, considered is an example of a voice recognition system which automatically selects and displays a sequence of recognition results optimized by a language model from prospective recognition results obtained per each voice for each word.

On the other hand, another example of a voice recognition system is disclosed in Japanese Unexamined Patent Publication No.328580/1996. In the example disclosed therein, prospective recognition results obtained through sequential voices is subjected to a language processing by the use of dynamic programming from one side, an that an optimized sequence of recognition results is automatically selected. Even if a certain word is wrong, a prospective recognition result for the wrong word is deleted by, for example an operation of a user, and is again subjected to a language processing by the use of dynamic programming from the one side to select a next optimized sequence of recognition results.

When the technique disclosed in the above-referenced paper No.328580/1996 is applied to prospective recognition results obtained through voices of discrete words, not only the best prospective recognition results but also the following ones next thereto can be obtained with respect to a certain voice, However, the aforesaid language processing using dynamic programming must be repeated n times in order to display the higher n prospective recognition results in rank with respect to a certain voice, A large number of calculations are therefore required inevitably.

SUMMARY OF THE INVENTION

It is therefore an object of the present invention to provide a voice recognition system which is capable of sorting prospective recognition results obtained for an appointed voice in optimized order by language processing of once.

Other objects of the present invention will become clear as the description proceeds.

On describing the gist of the present invention, it is readily understood that a voice recognition system seeks a plurality of prospective recognition results with respect to at least two input voices and selects each one prospective recognition result among respective a plurality of prospective recognition results with respect to the two input voices, so that an optimized sequence of recognition results is obtained as a whole.

According to an aspect of the present invention, there is provided a voice recognition system comprising: primary language processing means for carrying out a primary language processing by the use of dynamic programming on a primary prospective recognition result of a preceding voice which is preceding an appointed voice; secondary language processing means for carrying out a secondary language processing by the use of dynamic programming on a secondary prospective recognition result of a following voice which is following the appointed voice; scoring means for calculating, on each of primary prospective recognition results of the preceding voice, a cumulative score of an optimized path including appointed prospective recognition results of the appointed voice with reference to each result of the primary language processing and the secondary language processing; and sorting means for sorting the appointed prospective recognition results of the appointed voice in order from one of the appointed prospective recognition results having the largest value of the cumulative score.

According to another aspect of the present invention, there is provided a voice recognition system comprising: an acoustic processing unit for analyzing an input voice to produce an analyzed input voice; a standard pattern memorizing unit having standard acoustic patterns which have already been analyzed; a voice recognition unit which determines acoustic likelihood for showing similarities between the analyzed input voice and each of the standard acoustic patterns and which produces at least one prospective recognition result for each one voice together with the acoustic likelihood; a recognition result holding unit which stores the at least one prospective recognition result produced from the voice recognition unit to output a predetermined amount of the at least one prospective recognition result; a language processing unit which carries out a primary language processing on a primary prospective recognition result of a preceding input voice preceding an appointed input voice and a secondary language processing on a secondary prospective recognition result of a following input voice following the appointed input voice simultaneously by the use of dynamic programming, the language processing unit calculating, on each of prospective recognition results of the appointed voice, a cumulative score of an optimized path including the each of appointed prospective recognition results with reference to results of the primary language processing and the secondary language processing, and the language processing unit sorting the appointed prospective recognition results of the appointed voice in order from one of the appointed prospective recognition results having the largest value of the cumulative score; a context memorizing unit which memorizes a result of the primary language processing supplied from the language processing unit; a lattice constructing unit for constructing a lattice composed of the a predetermined amount of the prospective recognition results and the result output by the context memorizing unit; and the primary language processing being carried out from a left end of the lattice to the appointed voice while the secondary language processing being carried out from a right end of the lattice to the appointed voice.

The language processing may be carried out on all of voices in the lattice to obtain an optimized sequence of recognition results.

The voice recognition system may display a sequence of recognition results on the appointed voice in which prospective recognition results are sorted in optimized order and on the other voices following the appointed voice so as not to lose time after the appointed voice, so that the voice recognition system may rewrite the prospective recognition results in a case that recognition results are renewed by the the other voices following the appointed voice.

According to yet another aspect of the present invention, there is provided a voice recognition system comprising; an acoustic processing unit for analyzing an input voice to produce an analyzed input voice; a standard pattern memorizing unit having standard acoustic patterns which have already been analyzed; a voice recognition unit which determines acoustic likelihood for showing similarities between the analyzed input voice and each of the standard acoustic patterns and which produces at least one prospective recognition result for each one voice together with the acoustic likelihood; a recognition result holding unit which stores the at least one prospective recognition result produced from the voice recognition unit to output a predetermined amount of the at least one prospective recognition result; a lattice constructing unit for constructing a lattice composed of the a predetermined amount of the at least one prospective recognition result output by the recognition result holding unit; and a language processing unit which carries out a primary language processing on a primary prospective recognition result of a preceding input voice preceding an appointed input voice and a secondary language processing on a secondary prospective recognition result of a following input voice following the appointed input voice simultaneously by the use of dynamic programming, the language processing unit calculating, on each of appointed prospective recognition results of the appointed voice, a cumulative score of an optimized path including the each of appointed prospective recognition results with reference to results of the primary language processing and the secondary language processing, and the language processing unit sorting the appointed prospective recognition results of the appointed voice in order from one of the appointed prospective recognition results having the largest value of the cumulative score, the primary language processing being carried out from a left end of the lattice to the appointed voice while the secondary language processing being carried out from a right end of the lattice to the appointed voice.

BRIEF DESCRIPTION OF THE DRAWINGS

FIG. 5 is a view for showing a table of cumulative score and acoustic score in the voice recognition system according to the first embodiment of the present invention;

FIG. 6 is a view for showing a table of language score in the voice recognition system according to the first embodiment of the present invention;

DESCRIPTION OF THE PREFERRED EMBODIMENTS

Figure 1:
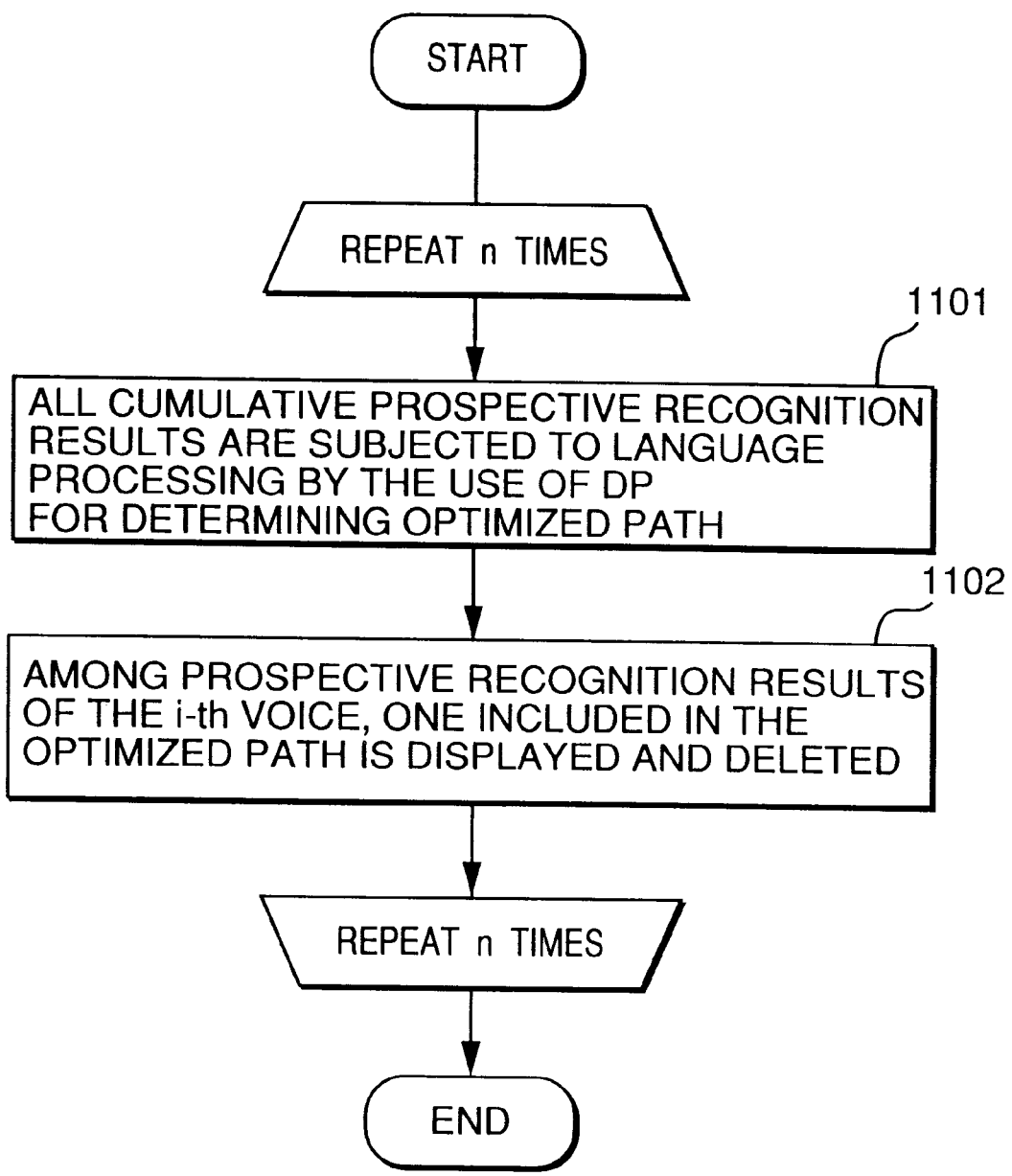
FIG. 1 is a flow chart for showing operations of automatically selecting the higher n prospective recognition results in rank obtained with respect to a certain voice (the i-th voice) in the conventional voice recognition system.

Referring to FIG. 1, description is, at first made about a conventional voice recognition system disclosed in the aforesaid Japanese Unexamined Patent Publication No.328580/1996 in order to facilitate an understanding of the present invention.

FIG. 1 is a flow chart for showing operations of automatically selecting the higher n prospective recognition results in rank obtained with respect to a certain voice (the i-th voice) in the conventional voice recognition system.

An input voice is turned into a plurality of prospective voice recognition results and stored in a recognition result holding portion as the prospective voice recognition results. In the recognition result holding portion, the higher n prospective recognition results in rank are displayed with respect to the i-th voice by repeating the following operations n times. Namely, all of the stored prospective recognition results are subjected to a language processing by the use of dynamic programming from one side to the other side, for example from a left side to a right side to seek an optimized path (step 1101). Within the prospective recognition results with respect to the i-th voice, a prospective recognition result included in the optimized path is displayed and deleted from the prospective recognition results (step 1102), The operations depicted at the steps 1101 and 1102 are repeated to show the higher n prospective recognition results in rank with respect to the i-th voice. Accordingly, all of the prospective recognition results can be sorted as mentioned before, provided that n is number of the prospective voice recognition results.

However, the aforesaid language processing using dynamic programming must be repeated n times in order to display the higher n prospective recognition results in rank with respect to a certain voice. A large number of calculations are therefore required inevitably, Now, referring to FIGS. 2 through 6, description will proceed to a voice recognition system according to a first embodiment of the present invention.

Figure 2:
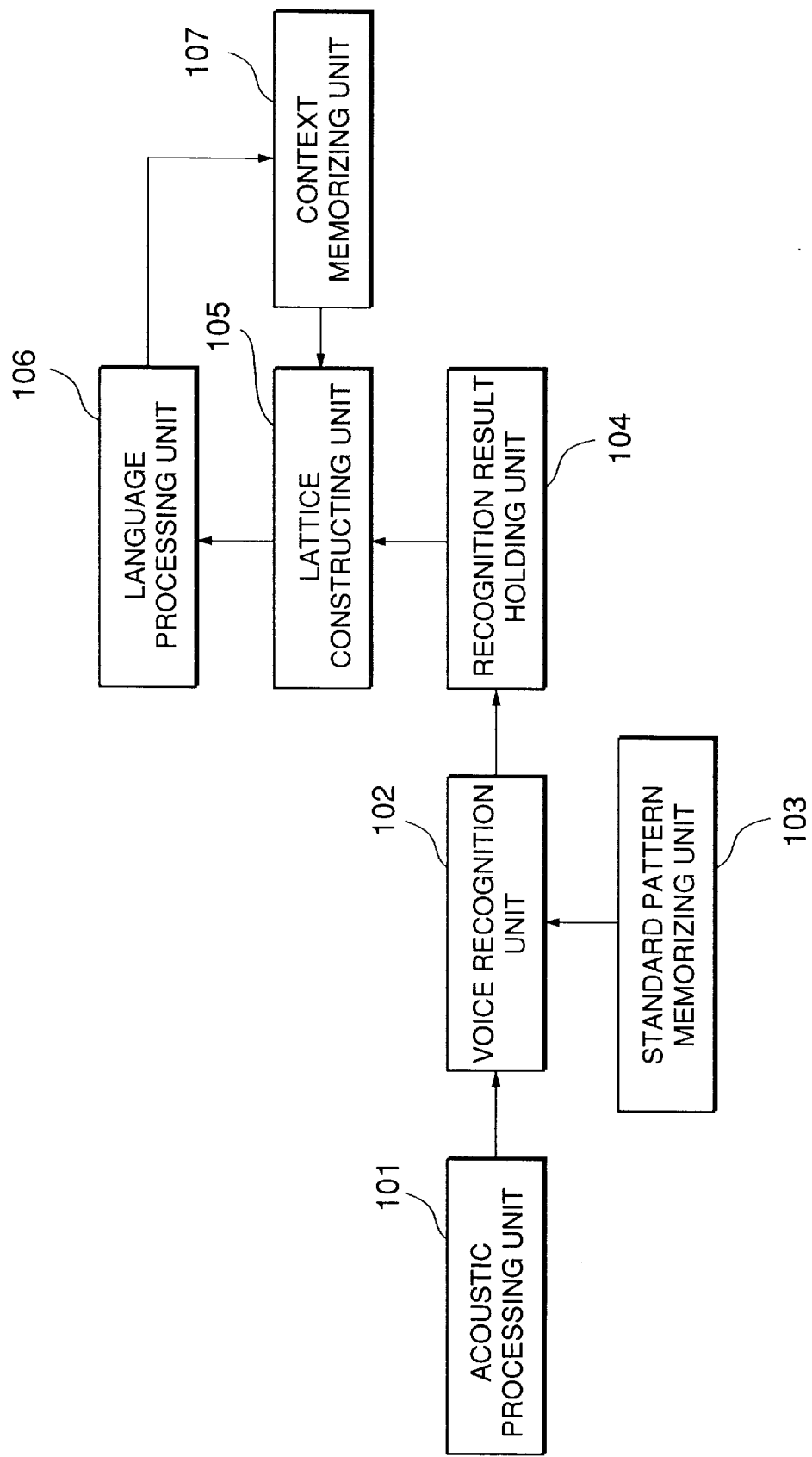
FIG. 2 is a block diagram for showing a voice recognition system according to a first embodiment of the present invention.

FIG. 2 is a block diagram for showing a voice recognition system according to a first embodiment of the present invention.

As illustrated in FIG. 2, an input voice produced per word is analyzed by an acoustic processing unit 101. The input voice analyzed by the acoustic processing unit 101 is compared with each standard pattern of the word stored in a standard pattern storing unit 103 by a voice recognition unit 102. Thereby, acoustic likelihood is determined between the input voice and each of the standard patterns. The input voice is analyzed, as mentioned above, and is changed into a sequence of parameter vectors by the acoustic processing unit 101. The acoustic processing unit 101 is composed of a filter bank, a Fourier transformer, a linear predictive factor type analyzer, and the like. The standard patterns stored in the standard pattern storing unit 103 are expressed as a sequence of parameter vectors. Among all of the standard patterns stored in the standard pattern storing unit 103, a plurality of the standard patterns having a large acoustic likelihood with the analyzed input voice are selected as prospective recognition results by the voice recognition unit 102. A predetermined amount of the prospective recognition results are and stored, in a recognition result holding unit 104 in order from the one produced precedently. When the number of voices exceeds the predetermined amount, a part of the prospective recognition results is deleted from an older one thereof in the recognition result holding unit 104, A cumulative score obtained with respect to a precedent voice by a language processing using dynamic programming in a preceding direction in a language processing unit 106 and prospective recognition results with respect to the precedent voice are stored in a storing unit 107. Contents stored in the context storing unit 107 are renewed by the language processing unit 106. A lattice is constructed by a lattice constructing unit 105 based on the prospective voice recognition results supplied from the the recognition result holding unit 104 and results of the language processing provided till then from the context storing unit 107. The lattice has prospective voice recognition results with respect to a voice immediately therebefore provided till then from the context storing unit 107 at the left end portion. The lattice also has prospective voice recognition results supplied from the recognition result holding unit 104 at a portion positioned right side of the left end portion. The language processing unit 106 applies a language model to the lattice provided from the lattice constructing unit 105 to sort the prospective voice recognition results with respect to an appointed voice in optimized order.

Referring to FIGS. 3 through 6, description is made as regards a structure of the lattice provided by the voice recognition system illustrated in FIG. 2.

Figure 3:
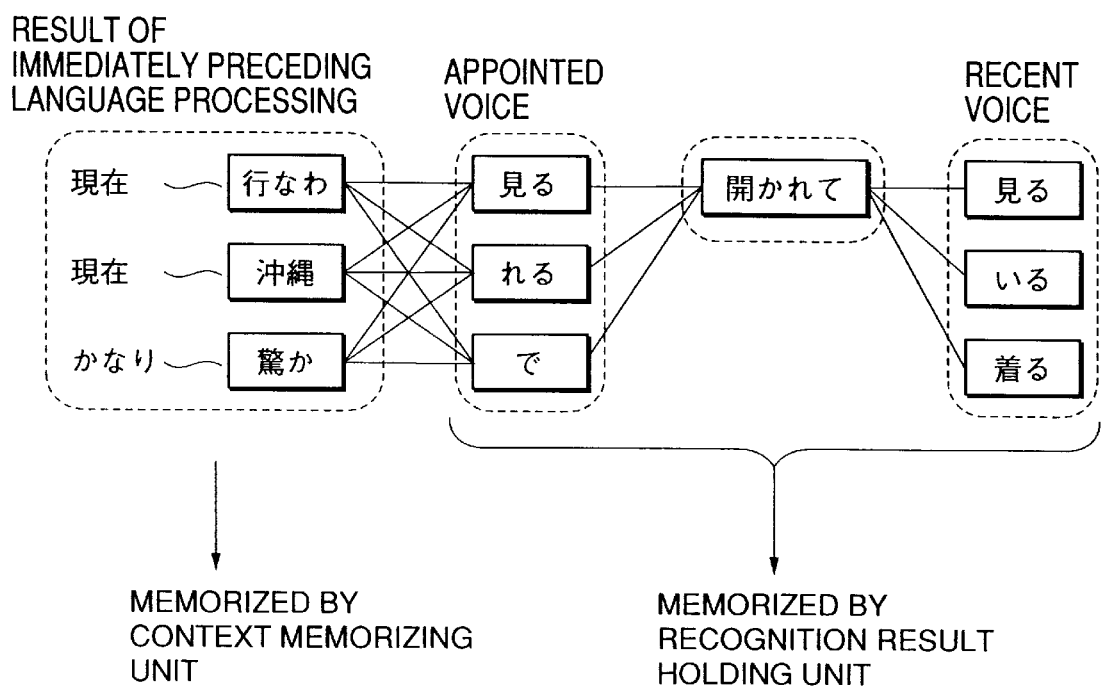
FIG. 3 is a view for showing an example of a lattice structure used in the voice recognition system according to the first embodiment of the present invention.
Figure 4:
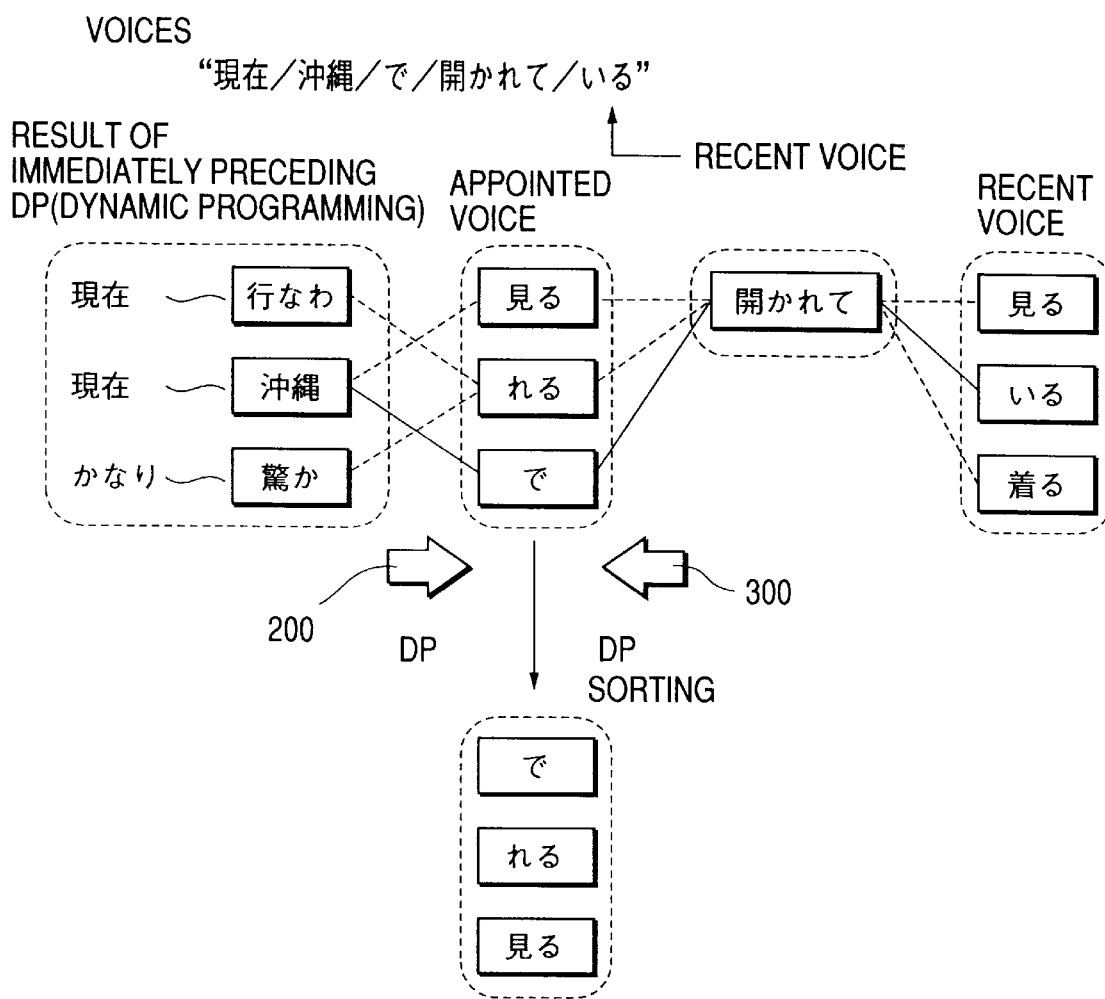
FIG. 4 is a view for explaining an example of a selection of the higher n prospective recognition results in rank with respect to an appointed voice.

FIG. 3 is a view for showing an example of a lattice used in the voice recognition system according to the first embodiment of the present invention. FIG. 4 is a view for explaining an example of a selection of the higher n prospective recognition results in rank with respect to a predetermined voice of k=2. FIG. 5 is a view for showing a table of cumulative score and acoustic score in the voice recognition system according to the first embodiment of the present invention. FIG. 6 is a view for showing a table of language score in the voice recognition system according to the first embodiment of the present invention.

Herein, referring to FIGS. 4 through 6, description is made with respect to an example in which the prospective voice recognition results with respect to an appointed voice are sorted in optimized order by the language processing unit 106. In the example being illustrated, the voices are [現在/沖縄/で/開かれて/いる] (Genzai/Okin awa/de/hirakarete/iru) while the most recent voice is [いる] (iru). In the example, word bigram is used as a language model. In the lattice, a prospective voice recognition result located at the left end portion is expressed "w.1" prospective voice recognition results to be sorted with respect to an appointed voice is expressed "w.2", and a prospective voice recognition result located at the right end portion is expressed "w.k+2".

In FIG. 4, illustrated is an example of k=2. An answer of the following equation (1) is determined with respect to every "w.2" in the language processing unit 106.

$$S\_f(w\_2) = \max_{w\_1} G(w\_1) + w * l(w\_1, w\_2) + a(w\_2) \quad (1)$$

wherein G(w-1) is a cumulative score of a column at the left end of the lattice, 1(w.1,w.2) is a language score decided by the word bigram model (a score decided in proportion to a conditional probability that a word "w.2" is produced next to a word "w.1"), a(w.i) is an acoustic likelihood of a word "w.i" and w is a constant. The answer of the above equation (1) can be efficiently determined by applying dynamic programming in a forward(future) direction (namely, toward a right hand direction of the sheet of FIG. 4, as depicted by a large arrow 200 in FIG. 4) from the left end.

On the other hand, an answer of the following equation (2) is determined with respect to every "w.2" by applying dynamic programming in a backward(past) direction (namely, toward a left hand direction of the sheet of FIG. 4, as depicted by a large arrow 300 in FIG. 4) from the right end to the appointed voice.

$$S\_b(w\_2) = \max_{w\_3,\ldots,w\_k+2} w * \left( \sum_{i=2}^{k+1} l(w\_i, w\_i+1) \right) + \sum_{i=3}^{k+2} a(w\_i) \quad (2)$$

In the appointed voice, the prospective voice recognition results are sorted in order from the one having the biggest score S.f(w.2)+S.b(w.2). Further, the language processing unit 106 produces each "w.2" and each S.f(w.2) to the recognition result holding unit 104 as a new cumulative score G(w.2).

As illustrated in FIG. 5, a cumulative score and an acoustic likelihood are assigned to each prospective voice recognition result in the lattice shown in FIG. 4. Further, as illustrated in FIG. 6, a language score is assigned to each couple of the words. In addition, each weight w=1 in both the, above equations (1) and (2).

On the other hand, it may be provided that connection between each couple of the words in FIG. 6 is prohibited, when the language score of the couple is "0". Accordingly, S.f(w.2) regarding the three prospective recognition results are determined, respectively, as follows.

|  | VALUE | SEQUENCE OF WORDS |
|---|---|---|
| S_f (見る) | 102 | 沖縄, 見る |
| S_f (れる) | 118 | 行なわ, れる |
| S_f (で) | 112 | 沖縄, で |

Similarly, S.b(w.2) regarding the three prospective recognition results are determined, respectively, as follows.

|  | VALUE | SEQUENCE OF WORDS |
|---|---|---|
| S_f (見る) | 18 | 見る, 開かれて, いる |
| S_f (れる) | 18 | れる, 開かれて, いる |
| S_f (で) | 37 | で, 開かれて, いる |

In view of the above, the prospective voice recognition results are sorted in order from the one having the biggest score S.f(w.2)+S.b(w.2). As a result, the sorted prospective voice recognition results are arranged in the following manner.

| w_2 | VALUE | SEQUENCE OF WORDS |
|---|---|---|
| で | 149 | 沖縄, で, 開かれて, いる |
| れる | 136 | 行なわ, れる, 開かれて, いる |
| 見る | 120 | 沖縄, 見る, 開かれて, いる |

As shown in the above manner, the prospective voice recognition results with respect to the appointed voice (the first voice) can be sorted in optimized order only by simultaneously applying dynamic programming of once from both the directions, namely from both the aforesaid forward and backward directions.

In FIG. 4, illustrated is the sorted prospective voice recognition results with respect to the appointed voice in optimized order [in order 「で」, 「れる」, 「見る」] [in order (de), (reru), (niru)]. At the same time, an optimized word sequence can also be determined in the lattice (the optimized word sequence is shown in the above manner by surrounded with a broken line). Therefore, an improved voice recognition system which never delays to a produced voice can be provided by displaying such an optimized word sequence. By the use of the recognition results after the appointed voice among the optimized word sequences, the result can be rewritten with respect even to the voices of which the result has already been displayed. Thus, an accuracy of the recognition results can be improved accordingly.

Figure 7:
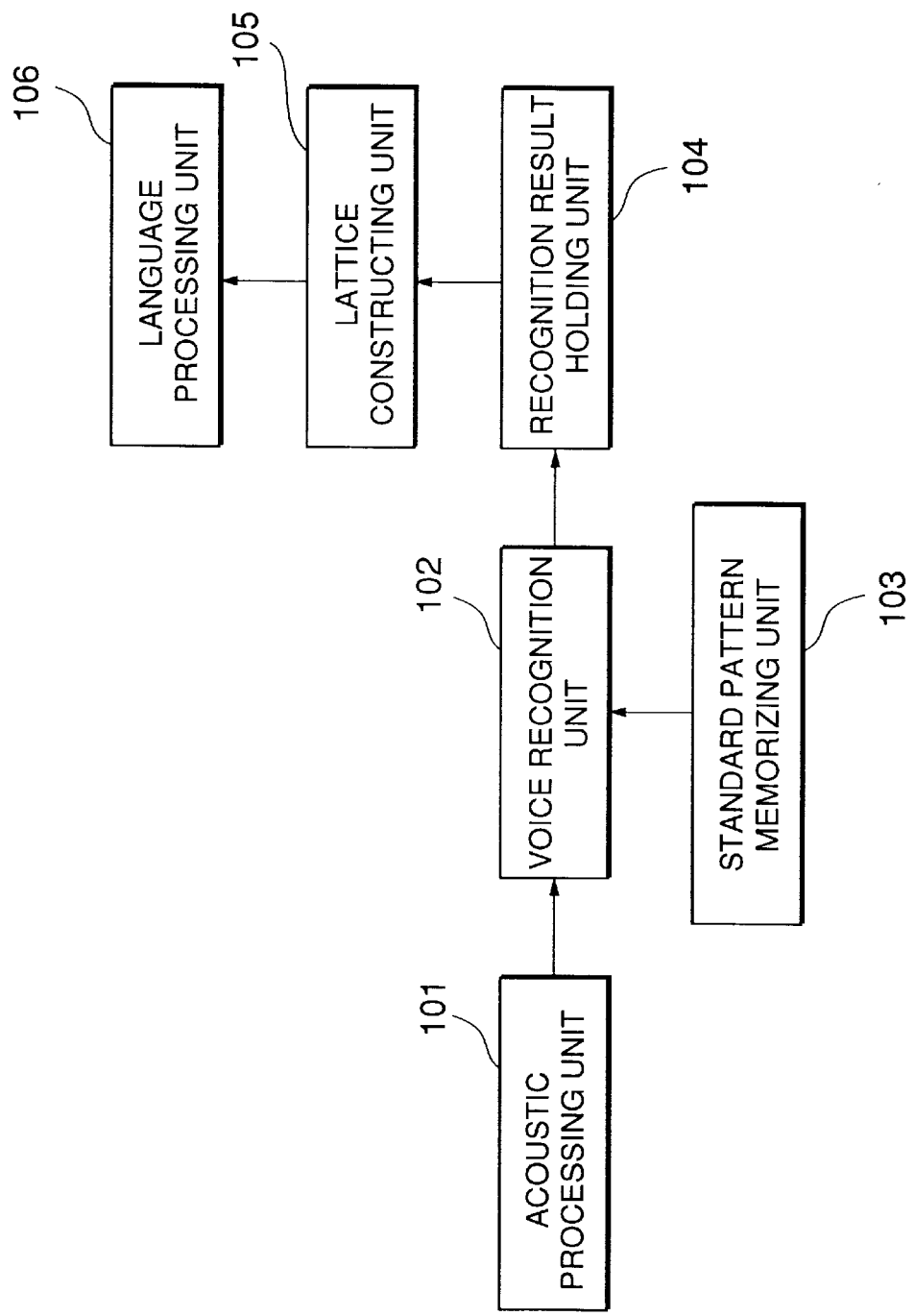
FIG. 7 is a block diagram for showing a voice recognition system according to a second embodiment of the present invention.
Figure 8:
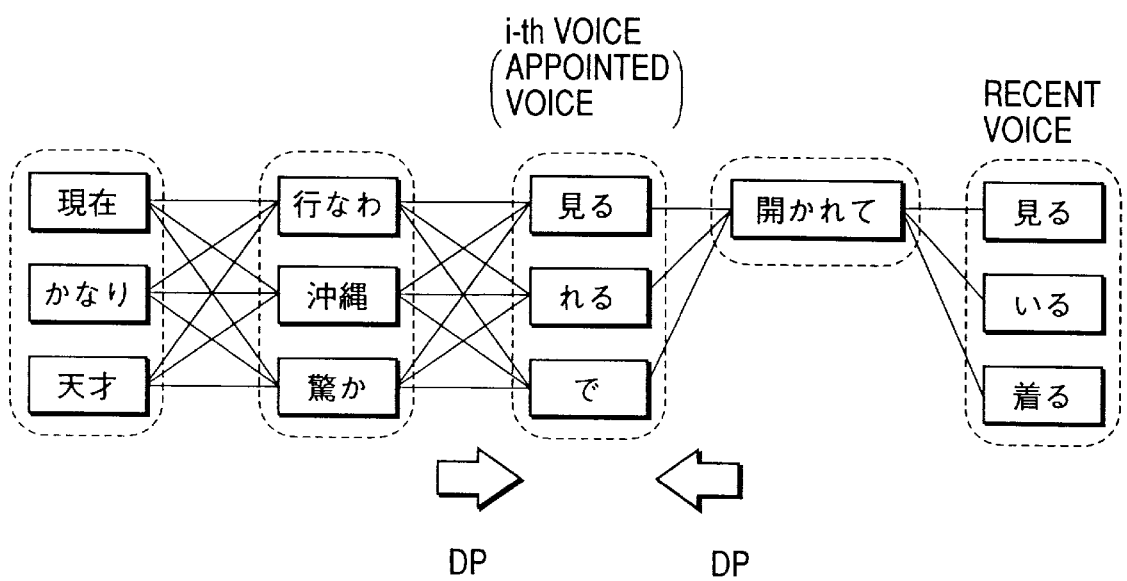
FIG. 8 is a view for showing an example of a lattice structure used in the voice recognition system according to the second embodiment of the present invention.

Referring to FIGS. 7 and 8, description will proceed to a voice recognition system according to a second embodiment of the present invention.

FIG. 7 is a block diagram for showing a voice recognition system according to a second embodiment of the present invention. FIG. 8 is a view for showing an example of a lattice used in the voice recognition system according to the second embodiment of the present invention.

As illustrated in FIG. 7, the voice recognition system according to the second embodiment has a structure basically similar to that of the first embodiment except that the voice recognition system of the second embodiment does not have a context, storing unit 107 in the first embodiment. Similar portions are designated by like reference numerals.

In the voice recognition system illustrated in FIG. 7, a lattice is constructed only from prospective voice recognition results stored in the recognition result holding unit 104.

As depicted in FIGS. 7 and 8, a language processing is carried out by the use of dynamic programming in a forward direction, namely, from the left end of the lattice to the appointed voice with respect to the prospective voice recognition results. At the same time, another language processing is also carried out by the use of dynamic programming in a backward direction, namely, from the right end of the lattice to the appointed voice with respect to the prospective voice recognition results. A sum of cumulative scores obtained by the language processing in the forward direction is compared with another sum of cumulative scores obtained by the another language processing in the backward direction. As the result of the comparison, the prospective voice recognition results are sorted. Accordingly, the prospective voice recognition results sorted in optimized order can be obtained.

In FIG. 8, an example is shown with "i=3". When the word bigram is used as a language model, a score supplied only from the left end of the lattice can be employed, similarly to the word unigram. In this case, a context storing unit can be omitted in the voice recognition system. Further, the voice recognition system can be free from an influence of an error made before the stored prospective voice recognition results.

As described above, according to the first and the second embodiments of the present invention, a respective language processing is simultaneously carried out toward an appointed voice by the use of dynamic programming from the both ends of the stored prospective voice recognition results, namely in both forward and backward directions. A voice recognition system becomes capable of sorting prospective recognition results obtained for the appointed voice in optimized order only by language processing of once.

While the present invention has thus far been described in conjunction with only two embodiments thereof, it will now be readily possible for those skilled in the art to put this invention into various other manners. For example, in the first embodiment, word bigram is used as a language model. However, the other language models such as n-gram model may be employed alternatively, provided that the language models can be applied by the use of dynamic programming, Moreover, in the first and the second embodiments, the voice recognition system of the present invention is applied to voice recognition in Japanese language. However, the principle of the present invention can be applied to voice recognition in any languages other than Japanese language.

What is claimed is:

1. A voice recognition system which seeks a plurality of prospective recognition results with respect to at least two input voices and which selects each one prospective recognition result among respective said plurality of prospective recognition results with respect to said at least two input voices, so that an optimized sequence of recognition results is obtained as a whole, comprising:

primary language processing means for carrying out a primary language processing in a forward-in-time direction with respect to said at least two input voices by the use of dynamic programming on a primary prospective recognition result of a preceding voice which is preceding an appointed voice;

secondary language processing means for carrying out a secondary language processing in a reverse-in-time direction with respect to said at least two input voices, by the use of dynamic programming on a secondary prospective recognition result of a following voice which is following said appointed voice;

scoring means for calculating, on each of primary prospective recognition results of said preceding voice, a cumulative score of an optimized path including appointed prospective results of said appointed voice with reference to each result of said primary language processing and said secondary language processing; and sorting means for sorting said appointed prospective recognition results of said appointed voice in order from one of said appointed prospective recognition results having the largest value of said cumulative score.

2. A voice recognition system comprising:

an acoustic processing unit for analyzing an input voice to produce an analyzed input voice;

a standard pattern storing unit having standard acoustic patterns which have already been analyzed;

a voice recognition unit which determines acoustic likelihood for showing similarities between said analyzed input voice and each of said standard acoustic patterns and which produces at least one prospective recognition result for each one voice together with said acoustic likelihood;

a recognition result holding unit which stores said at least one prospective recognition result produced from said voice recognition unit to output a predetermined amount of said at least one prospective recognition result;

a language processing unit which carries out a primary language processing on a primary prospective recognition result of a preceding input voice preceding an appointed input voice and a secondary language processing on a secondary prospective recognition result of a following input voice following said appointed input voice simultaneously by the use of dynamic programming, said language processing unit calculating, on each of prospective recognition results of said appointed voice, a cumulative Score of an optimized path including said each of appointed prospective recognition results with reference to results of said primary language processing and said secondary language processing, and said language processing unit sorting said appointed prospective recognition results of said appointed voice in order from one of said appointed prospective recognition results having the largest value of said cumulative score;

a context storing unit which stores a result of said primary language processing supplied from said language processing unit;

a lattice constructing unit for constructing a lattice composed of said a predetermined amount of said prospective recognition results and said result output by said context storing unit; and said primary language processing being carried out from a left end of said lattice to said appointed voice while said secondary language processing being carried out from a right end of said lattice to said appointed voice.

3. A voice recognition system as claimed in claim 2, wherein said language processing are carried out on all of voices in said lattice to obtain an optimized sequences of recognition results.

4. A voice recognition system as claimed in claim 3, wherein said voice recognition system displaying a sequence of recognition results on said appointed voice in which prospective recognition results are sorted in optimized order and on the other voices following said appointed voice so as not to lose time after said appointed voice, rewriting said prospective recognition results in a case that recognition results are renewed by said the other voices following said appointed voice.

5. A voice recognition system comprising:

an acoustic processing unit for analyzing an input voice to produce an analyzed input voice;

a standard pattern storing unit having standard acoustic patterns which have already been analyzed;

a voice recognition unit which determines acoustic likelihood for showing similarities between said analyzed input voice and each of said standard acoustic patterns and which produces at least one prospective recognition result for each one voice together with said acoustic likelihood;

a recognition result holding unit which stores said at least one prospective recognition result produced from said voice recognition unit to output a predetermined amount of said at least one prospective recognition result;

a lattice constructing unit for constructing a lattice composed of said a predetermined amount of said at least one prospective recognition result output by said recognition result holding unit; and a language processing unit which carries out a primary language processing on a primary prospective recognition result of a preceding input voice preceding an appointed input voice and a secondary language processing on a secondary prospective recognition result of a following input voice following said appointed input voice simultaneously by the use of dynamic programming, said language processing unit calculating, on each of appointed prospective recognition results of said appointed voice, a cumulative score of an optimized path including said each of appointed prospective recognition results with reference to results of said primary language processing and said secondary language processing, and said language processing unit sorting said appointed, prospective recognition results of said appointed voice in order from one of said appointed prospective recognition results having the largest value of said cumulative score, said primary language processing being carried out from a left end of said lattice to said appointed voice while said secondary language processing being carried out from a right end of said lattice to said appointed voice.

6. A voice recognition system as claimed in claim 5, wherein said language processing are carried out on all of voices in said lattice to obtain an optimized sequence of recognition results.

7. A voice recognition system as claimed in claim 6. wherein said voice recognition system displaying a sequence of recognition results on said appointed voice in which prospective recognition results are sorted in optimized order and on the other voices following said appointed voice so as not to lose time after said appointed voice, rewriting said prospective recognition results in a case that recognition results are renewed by said the other voices following said appointed voice.

\* \* \* \* \*